US008166193B2

(12) United States Patent
Zheng

(10) Patent No.: US 8,166,193 B2
(45) Date of Patent: *Apr. 24, 2012

(54) FILE TRANSFER PROTOCOL FOR MOBILE COMPUTER

(75) Inventor: Jianyu Roy Zheng, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/644,245

(22) Filed: Dec. 22, 2009

(65) Prior Publication Data

US 2010/0100638 A1    Apr. 22, 2010

(51) Int. Cl.
*G06F 15/16* (2006.01)
(52) U.S. Cl. ........ 709/232; 709/230; 709/231; 709/237; 709/222; 370/229; 370/230; 370/235; 710/11; 710/105
(58) Field of Classification Search .................. 709/202, 709/227, 239, 105, 206; 455/41, 552.1, 426, 455/462; 370/316; 348/143; 379/1.01; 705/75
See application file for complete search history.

(56) References Cited

U.S. PATENT DOCUMENTS

| | | | |
|---|---|---|---|
| 6,356,622 B1 * | 3/2002 | Hassell et al. | 379/1.01 |
| 7,225,260 B2 * | 5/2007 | Herrod | 709/227 |
| 7,506,064 B1 * | 3/2009 | Kruger et al. | 709/239 |
| 7,594,017 B1 * | 9/2009 | DiValentino | 709/227 |

| | | | |
|---|---|---|---|
| 2001/0055951 A1 * | 12/2001 | Slotznick | 455/41 |
| 2002/0101831 A1 * | 8/2002 | Gutman et al. | 370/316 |
| 2002/0163934 A1 * | 11/2002 | Moore et al. | 370/465 |
| 2002/0178126 A1 * | 11/2002 | Beck et al. | 705/75 |
| 2002/0194251 A1 * | 12/2002 | Richter et al. | 709/105 |

(Continued)

OTHER PUBLICATIONS

"List of Network Protocols—Definition." Dictionary, Encyclopedia and Thesaurus—WordIQ Dictionary. Web. <http://www.wordiq.com/definition/List_of_network_protocols>.*

(Continued)

*Primary Examiner* — Faruk Hamza
*Assistant Examiner* — Michael Martinez
(74) *Attorney, Agent, or Firm* — John L. Rogitz

(57) ABSTRACT

A method is disclosed for communicating using a device having a Palm OS. SMB is preferentially used to communicate with a node, and if use of SMB is not possible, FTP is used, and if use of FTP is not possible, Bluetooth is used. If FTP or Bluetooth is selected as the protocol, file sharing between the device and node that entails a read or write is executed by temporarily copying a file to an internal Palm OS memory of the device, performing the read or write on the file, and then copying the file back to the node to overwrite a previous version of the file at the node. For non-Palm OS file transfer to the internal memory, the file is wrapped in a Palm OS stream in the internal memory for executing reads or writes. For file transfer to an expansion Palm OS memory card, byte-to-byte copying of the file is executed using the FAT of the expansion memory, with the file being transferred through an internal Palm OS memory of the device.

20 Claims, 4 Drawing Sheets

U.S. PATENT DOCUMENTS

| | | | |
|---|---|---|---|
| 2003/0139179 A1* | 7/2003 | Fuchs et al. | 455/426 |
| 2004/0061718 A1* | 4/2004 | Fitzpatrick et al. | 345/758 |
| 2004/0204029 A1* | 10/2004 | Parry | 455/552.1 |
| 2005/0030375 A1* | 2/2005 | Zangrande et al. | 348/143 |
| 2006/0030341 A1* | 2/2006 | Pham | 455/462 |
| 2008/0263130 A1* | 10/2008 | Michalowitz et al. | 709/202 |
| 2011/0060804 A1* | 3/2011 | Alfke | 709/206 |

OTHER PUBLICATIONS

Kastner, W.; Kunes, M.; , "Device and network management for PDAs: an SNMP-manager for the Palm OS," Networked Appliances, 2002. Gaithersburg. Proceedings. 2002 IEEE 4th International Workshop on , vol., no., pp. 67-76, 2002.*

* cited by examiner

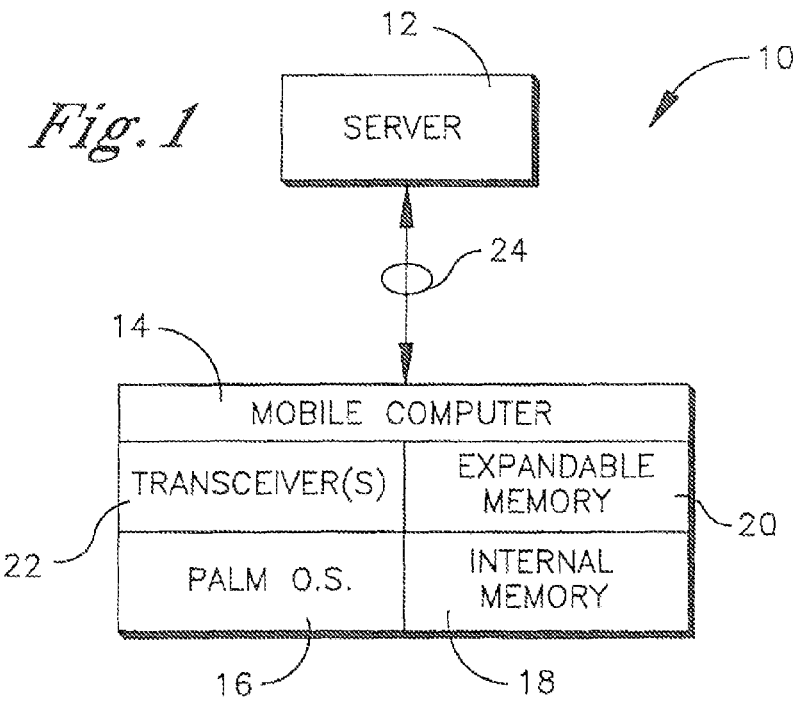

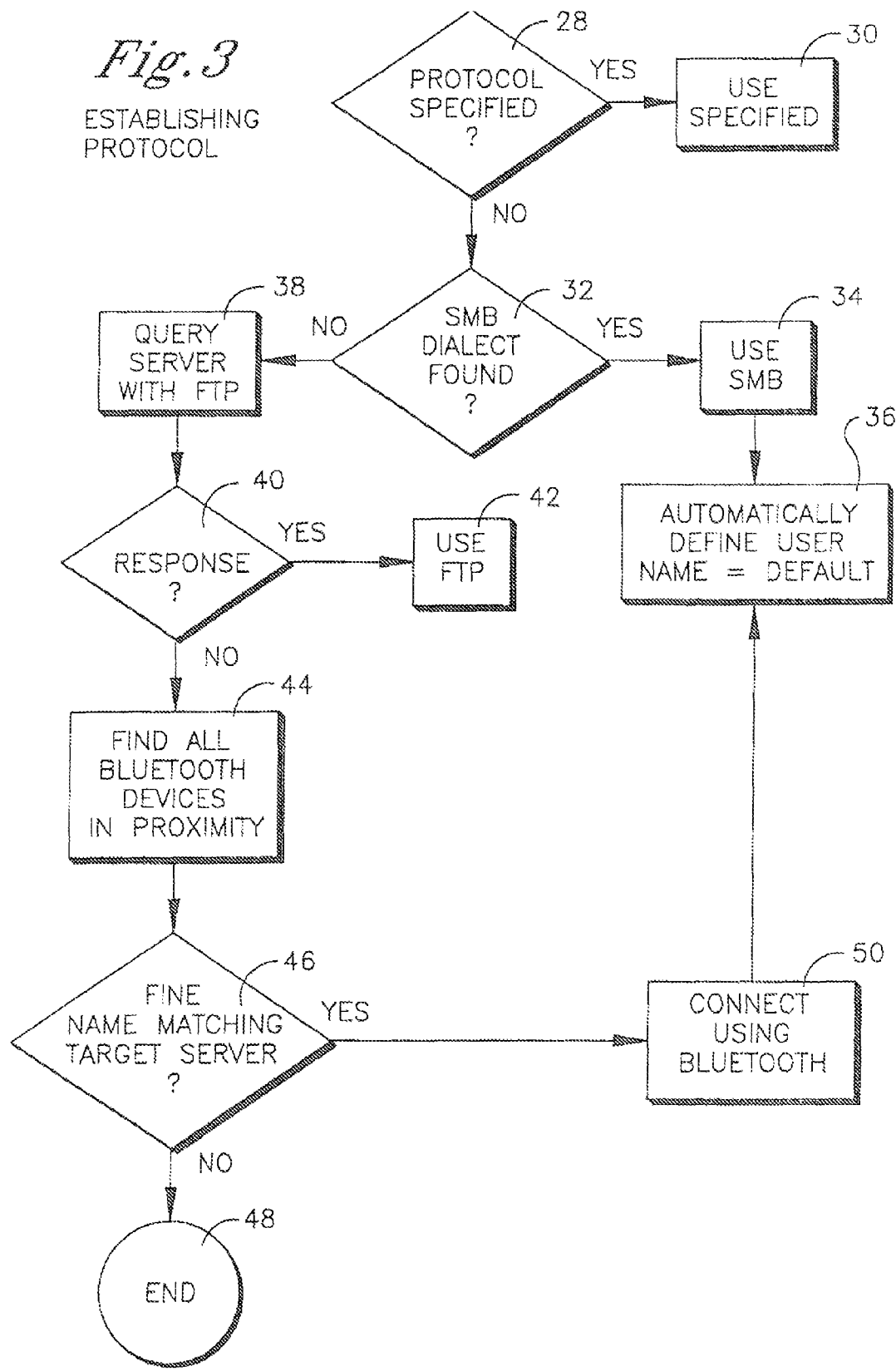
Fig.3 ESTABLISHING PROTOCOL

FILE SHARING

FILE TRANSFER

FILE TRANSFER PROTOCOL FOR MOBILE COMPUTER

RELATED APPLICATIONS

This application claims priority from U.S. provisional application No. 60/518,285 filed on Nov. 7, 2003.

FIELD OF THE INVENTION

The present invention relates generally to computer file sharing and transfers using mobile computers.

BACKGROUND

Computer files can be transferred between computers using one of a variety of protocols, most of which are intended for use with personal computer operating systems (OS). For example, the generic File Transfer Protocol (FTP) for PCs, which essentially is a top level application program that relies on processing and communication layers in a PC OS, enables files to be transferred with security control to do such things as navigate, create, and delete directories, and to copy and delete files, and so on. A more widely used protocol is the server message block (SMB) protocol, which facilitates even more operations including sharing files, serial ports, and printers. SMB can also provide for two levels of security.

Yet a third protocol for transferring files between devices is Bluetooth, which is intended for wireless environments and which essentially offers the same capabilities as FTP. All of these protocols assume use with a PC OS and require both ends of the transmission (client and server, for instance) to possess communication protocol stacks that match each other.

As understood herein, the above protocols are designed with the PC OS in mind, but that other OS such as Palm OS are used in smaller wireless devices such as wireless telephones and personal digital assistants (PDA). As further understood herein, the Palm OS does not have all of the PC OS features that conventional file sharing protocols assume. For example, as recognized herein, the Palm OS does not have a conventional file system in its internal memory, which is relatively small. Rather, files are stored as databases with header information. Further, network communication support in Palm OS is confined to the transmission control protocol/Internet protocol (TCP/IP) layer. With the above observations in mind, the present invention has been provided.

SUMMARY OF THE INVENTION

A method for communicating using a device having a Palm operating system (OS) includes preferentially using server message block (SMB) to communicate with a node, and if use of SMB to communicate with the node is not possible, using file transfer protocol (FTP). If use of FTP is not possible to communicate with the node, Bluetooth is used.

In illustrative embodiments, if a protocol for communication between the device and a communication node has not been identified, it is determined whether the node can communicate using a SMB dialect available to the device, and if so, SMB is selected as the communication protocol. If the node cannot communicate using a SMB dialect available to the device, the node is queried with a FTP message and if an appropriate response is received, FTP is selected as the communication protocol. On the other hand, if an appropriate response is not received, identifications of devices are attempted to be gathered using Bluetooth, and if an identification matches the identification of the node, Bluetooth is selected as the communication protocol.

If SMB or Bluetooth is selected as the protocol, a user name can be automatically set to a default name. In contrast, if FTP or Bluetooth is selected as the protocol, file sharing between the device and node that entails a read or write may be executed by temporarily copying a file to an internal Palm OS memory of the device, performing the read or write on the file, and then copying the file back to the node to overwrite a previous version of the file at the node. For file transfer to or from the internal memory of the device, the method can include transferring a file that is not in Palm OS format between the internal memory and the node by wrapping the file in a Palm OS stream in the internal memory and performing a read or a write on the file. On the other hand, for file transfer to or from an expansion memory of the device, the method can include transferring a file between the expansion memory and the node by byte-to-byte copying of the file using a file allocation table (FAT) of the expansion memory. In this case, the file may be transferred through the internal memory.

In another aspect, a system includes a processor communicating using a protocol stack. The stack can include an application layer having at least two application layer protocols selected from the group including Bluetooth, file transfer protocol (FTP), and server message block (SMB). A protocol layer is on top of the application layer for selecting which application layer protocol to use to communicate with a node.

In still another aspect, a Palm OS device has an internal memory, an expansion memory, and a Palm operating system (OS) accessing the memories. Means are provided to the Palm OS for determining whether the node can communicate using a SMB dialect available to the device, and if so, selecting SMB as the communication protocol. Means are also provided to the Palm OS for, if the node cannot communicate using a SMB dialect available to the device, querying the node with a FTP message, and if an appropriate response is received, selecting FTP as the communication protocol. Still further, means are provided for, if an appropriate response is not received, gathering identifications of devices using Bluetooth. If an identification matches an identification of the node, Bluetooth is selected.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of the present mobile file transfer protocol (mFTP), shown in one intended environment;

FIG. 2 is a schematic representation of an exemplary protocol stack of the present mFTP;

FIG. 3 is a flow chart of the logic of the present mFTP in selecting the protocol;

DETAILED DESCRIPTION OF THE PREFERRED EMBODIMENT

Figure 4:
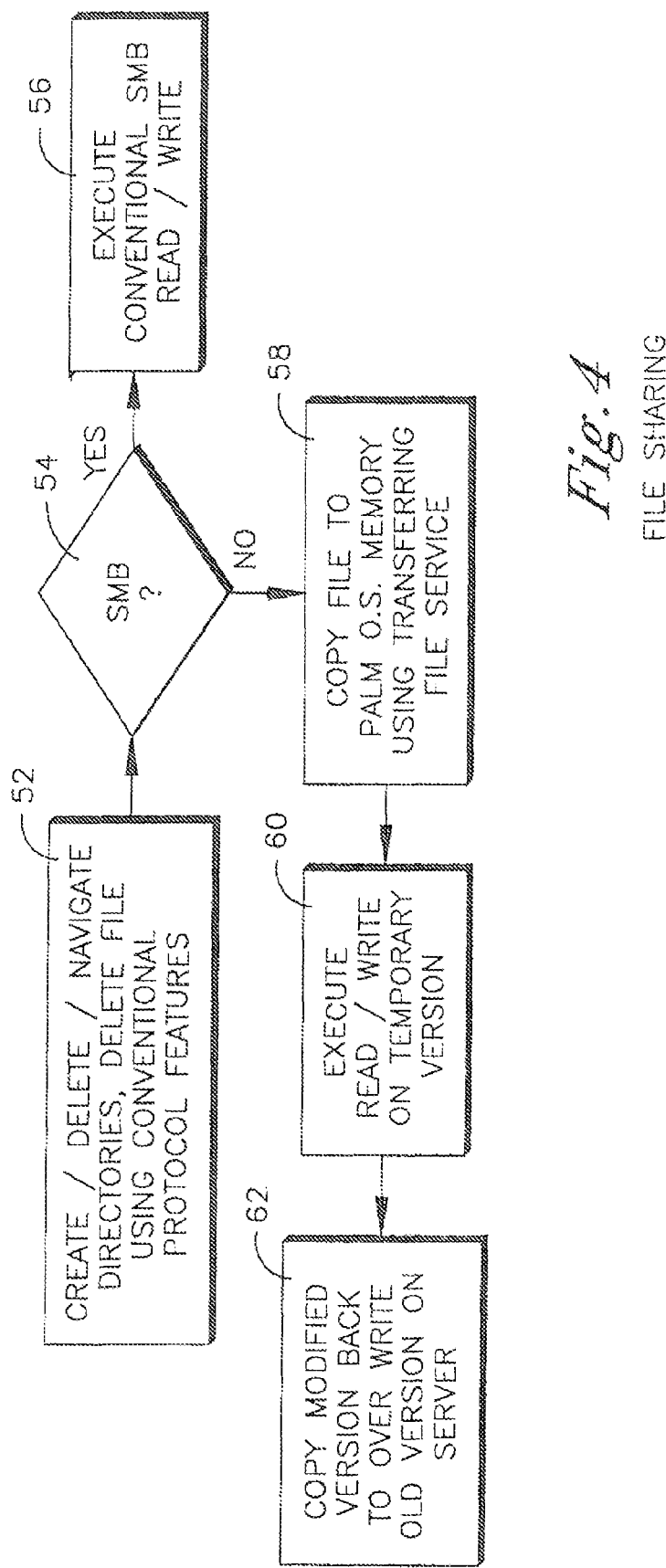
FIG. 4 is a flow chart showing the file sharing logic.

Referring initially to FIG. 1, a system is shown, generally designated 10, that includes one or more servers 12 communicating with one or more mobile computing devices 14. The mobile computing device 14 may be a wireless telephone, personal digital assistant (PDA), or other device that uses a non-personal computer (PC) operating system (OS), and in the embodiment shown that uses a Palm OS 16. The OS 16 can access an internal memory 18 and an expansion memory 20 that may be implemented by an expansion memory card. The OS 16 also accesses at least two transceivers 22 for purposes to be shortly disclosed for communicating with the server 12 over a wired or wireless link 24. The transceivers 22 can include modems, 802.11 devices, and Bluetooth infrared (IR) and/or radiofrequency (rf) transceivers.

FIG. 2 shows one embodiment of the protocol stack 26 of the present invention, which need not be exactly paired in the server 12. The stack 26 can include an application layer that includes a top-most mFTP layer which functions as described herein over a Bluetooth FTP layer, a SMB layer, and a FTP layer. The Bluetooth FTP layer is on top of a conventional Object Exchange protocol (OBEX) presentation, session, network, and transport layer. Under the OBEX layer in turn can be conventional Bluetooth (radiofrequency) and infrared data link and physical layers.

On the other hand, as shown in FIG. 2 the data link and physical layer for the SMB layer is a conventional IEEE 802.11 layer, whereas the data link and physical layer for the FTP layer is a conventional modem. A conventional Palm OS TCP/IP stack serves as the network and transport layer for both the SMB layer and FTP layer. However, unlike a conventional Palm OS architecture, in accordance with the present invention a net basic input/output system (NetBIOS) layer is provided as a session layer between the SMB layer and Palm OS TCP/IP layer. The logic below is implemented by the cooperation between the mFTP layer, Bluetooth FTP layer, SMB layer with NetBIOS layer, and FTP layer.

It is to be understood that the processor of the computer 14 accesses the OS 16 to undertake the logic shown and discussed below, which may be executed by a processor as a series of computer-executable instructions.

The instructions may be contained on a data storage device with a computer readable medium, such as a computer diskette having a computer usable medium with computer readable code elements stored thereon. Or, the instructions may be stored on a DASD array, magnetic tape, conventional hard disk drive, electronic read-only memory, optical storage device, or other appropriate data storage device, such as the internal memory 18. In an illustrative embodiment of the invention, the computer-executable instructions may be lines of compiled C++ compatible code or JAVA®.

Indeed, the flow charts herein illustrate the structure of the logic of the present invention as embodied in computer program software. Those skilled in the art will appreciate that the flow charts illustrate the structures of computer program code elements including logic circuits on an integrated circuit, that function according to this invention. Manifestly, the invention is practiced in its essential embodiment by a machine component that renders the program code elements in a form that instructs a digital processing apparatus (that is, a computer) to perform a sequence of function acts corresponding to those shown.

FIG. 3 illustrates the logic of the present mFTP. It is to be understood that FIG. 3 assumes that a correct user name and password have been input and accepted.

Commencing at decision diamond 28, it is determined whether the desired underlying protocol (SMB, Bluetooth, or FTP) has been specified, e.g., by the user. If it has, the logic flows to block 30 to use the specified protocol. Otherwise, the logic flows to decision diamond 32 to determine whether a suitable SMB dialect can be negotiated with the server. If so, SMB is selected as the protocol at block 34, and the user name is automatically set to the default name at block 36. In contrast, if no SMB dialect can be agreed upon, the logic flows to block 38 to query the server using FTP, and then at decision diamond 40 it is determined whether a suitable response has been received. If so, the logic selects FTP as the protocol at block 42. Otherwise, all Bluetooth devices in the proximity of the device are located at block 44 using Bluetooth principles known in the art.

At decision diamond 46, it is determined whether any device name that is returned as a result of the previous locating step matches the name of the desired file server with which connection is to be made. If not the logic ends at state 48, but otherwise the logic connects to the server using Bluetooth at block 50, and then automatically sets the user name to default at block 36.

FIG. 4 shows the logic for sharing files between the device and server. Block 52 simply indicates that directories are created, deleted, and navigated and files deleted using the conventional features of the underlying protocol selected as a result of FIG. 3. Decision diamond 54 indicates that if SMB was selected in FIG. 3, reading and writing files may be done conventionally at block 56. However, if. FTP or Bluetooth is the selected protocol, the logic proceeds to block 58 to temporarily copy the file to be shared to the local internal Palm OS memory of the device using the underlying file transfer service. A read (or write, as appropriate) is then executed on the temporary version at block 60, and the result is copied back to the appropriate location in the server at block 62 to overwrite the version on the remote server. Running a Palm OS application on the device from the remote server is executed using the read or write file function described above.

Figure 5:
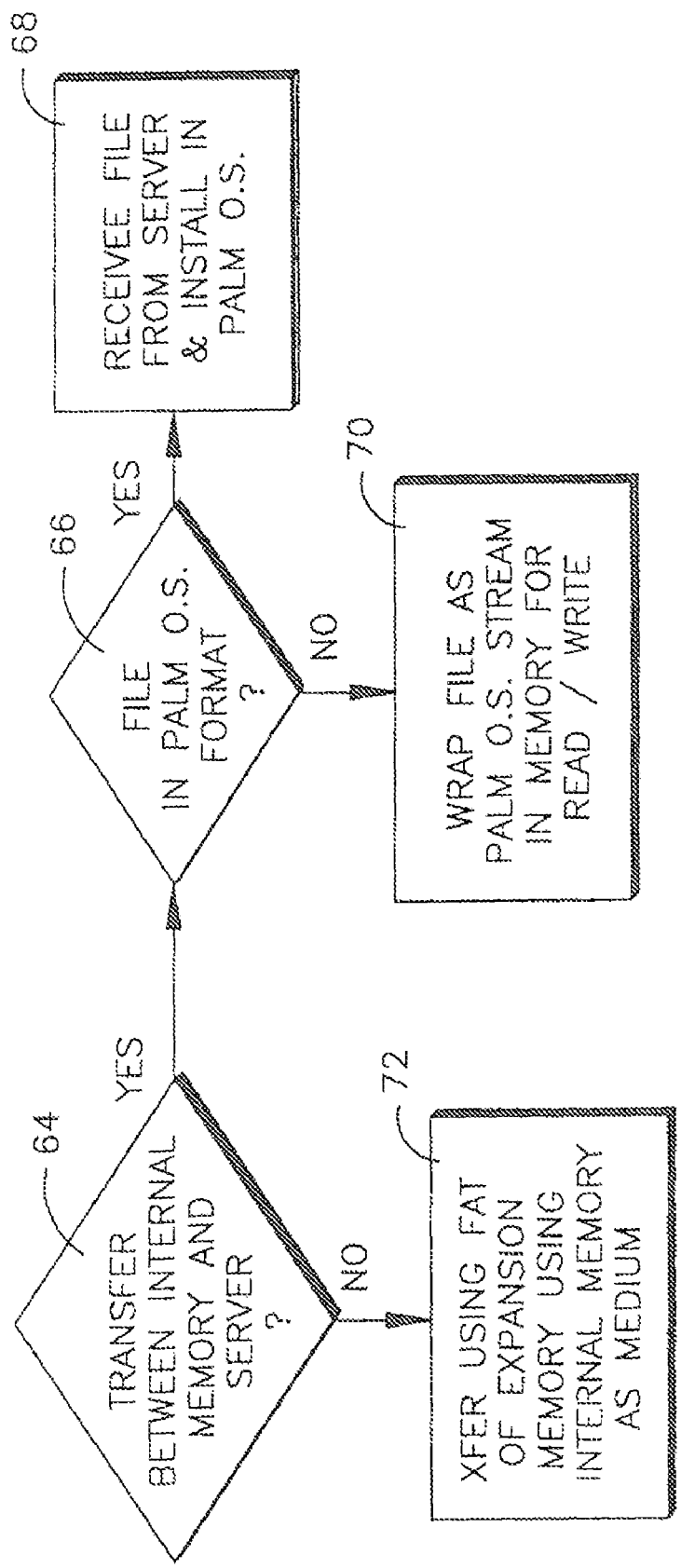
FIG. 5 is a flow chart showing the file transfer logic.

FIG. 5 shows the file transfer logic. Decision diamond 64 represents a branch in the logic depending on whether the file is to be transferred between the server 12 and the local internal Palm OS memory 18 or between the server and the expansion Palm OS memory 20. In the former case, the logic flows to decision diamond 66 to determine whether the file in question is in Palm OS format, and if it is the logic moves to block 68 to receive the file from the server (for a read) or transfer the file to the server (for a write) using Palm OS principles known in the art. If the file is not in OS format, however, the logic proceeds to block 70 to wrap the file in a Palm OS stream in the internal memory of the Palm OS so that the file can be read or written but not necessarily be directly accessible to an end user of the device.

If the file is to be transferred to or from the expansion memory 20, which is expected to employ a conventional file allocation table (FAT), the logic moves from decision diamond 64 to block 72 to transfer the file using the FAT in a byte-to-byte copy, using the Palm OS native internal memory as a transmission medium.

While the particular FILE TRANSFER PROTOCOL FOR MOBILE COMPUTER as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A method for communicating using a mobile device having a Palm operating system (OS), comprising, responsive to a determination that a user selection of a protocol application has not been made, using a first protocol application not selected by the user to communicate with a node, and if use of the first protocol application to communicate with the node is not possible, using a second protocol application not selected by the user to communicate with the node.

2. The method of claim 1, wherein if a protocol application for communication between the device and a communication node has not been identified, determining whether the node can communicate using a SMB dialect available to the device, and if so, selecting SMB as the communication protocol application.

3. The method of claim 2, wherein if the node cannot communicate using a SMB dialect available to the device, the node is queried with a FTP message and if an appropriate response is received, FTP is selected as the communication protocol application.

4. The method of claim 3, wherein if an appropriate response is not received, identifications of devices are attempted to be gathered using Bluetooth, and if an identification matches the identification of the node, Bluetooth is selected as the communication protocol application.

5. The method of claim 4, wherein if SMB or Bluetooth is selected as the protocol application, a user name is automatically set to a default name.

6. The method of claim 4, wherein if FTP or Bluetooth is selected as first or second protocol application, file sharing between the device and node that entails a read or write is executed by temporarily copying a file to an internal Palm OS memory of the device, performing the read or write on the file, and then copying the file back to the node to overwrite a previous version of the file at the node.

7. The method of claim 1, comprising transferring at least one file not in Palm OS format between an internal Palm OS memory of the device and the node by wrapping the file in a Palm OS stream in the internal memory and performing at least one of a read, and a write, on the file.

8. The method of claim 1, comprising transferring at least one file between an expansion Palm OS memory of the device and the node by byte-to-byte copying of the file using a file allocation table (FAT) of the expansion memory, the file being transferred through an internal Palm OS memory of the device.

9. A system, comprising:
at least one processor on a mobile device having a Palm operating system (OS) and communicating using a protocol stack including:
an application layer having at least two application layer protocol applications; and
a protocol selection layer on top of the application layer for selecting which application layer protocol application to use to communicate with a node in accordance with a predetermined priority among the protocol applications;
wherein the predetermined priority includes using a first protocol application not selected by the user to communicate with the node, and if use of the first protocol application to communicate with the node is not possible, using a second protocol application not selected by the user to communicate with the node.

10. The system of claim 9, wherein the application layer has three application layer protocol applications.

11. The system of claim 10, comprising a Palm operating system (OS) accessing the protocol stack.

12. The system of claim 11, wherein the Palm OS executes logic comprising:
using SMB to communicate with a node, and if use of SMB to communicate with the node is not possible, using FTP, and if use of FTP is not possible to communicate with the node, using Bluetooth.

13. The system of claim 12, wherein if FTP or Bluetooth is selected, the Palm OS executes file sharing between the device and node that entails a read or write by temporarily copying a file to an internal Palm OS memory, performing the read or write on the file, and then copying the file back to the node to overwrite a previous version of the file at the node.

14. The system of claim 13, wherein the Palm OS transfers at least one file not in Palm OS format between the internal Palm OS memory and the node by wrapping the file in a Palm OS stream in the internal memory and performing at least one of: a read, and a write, on the file.

15. The system of claim 14, wherein the Palm OS transfers at least one file between an expansion Palm OS memory and the node by byte-to-byte copying of the file using a file allocation table (FAT) of the expansion memory, the file being transferred through the internal Palm OS memory.

16. A method, comprising:
determining whether the node can communicate using a first protocol available to the device that is not designated by a user of the device but that is predetermined;
selecting the first protocol as the communication protocol if communication between the device and node is possible using the first protocol;
if the node cannot communicate using the first protocol available to the device, querying the node with a message to determine if the node can communicate using a second protocol that is not designated by a user of the device but that is predetermined; and
selecting the second protocol as the communication protocol.

17. The method of claim 16, wherein if SMB or Bluetooth is selected as the protocol, the method further includes automatically setting a user name to a default name.

18. The method of claim 16, wherein if FTP or Bluetooth is selected as the protocol, file sharing between the device and node that entails a read or write is executed by temporarily copying a file to an internal Palm OS memory of the device, performing the read or write on the file, and then copying the file back to the node to overwrite a previous version of the file at the node.

19. The method of claim 16, comprising transferring at least one file not in Palm OS format between an internal Palm OS memory of the device and the node by wrapping the file in a Palm OS stream in the internal memory and performing at least one of: a read, and a write, on the file.

20. The method of claim 16, comprising transferring at least one file between an expansion Palm OS memory of the device and the node by byte-to-byte copying of the file using a file allocation table (FAT) of the expansion memory, the file being transferred through an internal Palm OS memory of the device.

* * * * *